United States Patent
Mogi et al.

(10) Patent No.: US 9,269,472 B2
(45) Date of Patent: Feb. 23, 2016

(54) FLUORINE-DOPED TIN-OXIDE PARTICLES AND MANUFACTURING METHOD THEREFOR

(75) Inventors: Satoshi Mogi, Saitama (JP); Kazuhiko Kato, Saitama (JP); Kenji Suzuoka, Saitama (JP); Yasunori Tabira, Saitama (JP); Isamu Yashima, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 13/983,393

(22) PCT Filed: Mar. 6, 2012

(86) PCT No.: PCT/JP2012/055663
§ 371 (c)(1),
(2), (4) Date: Aug. 2, 2013

(87) PCT Pub. No.: WO2012/124540
PCT Pub. Date: Sep. 20, 2012

(65) Prior Publication Data
US 2014/0093734 A1  Apr. 3, 2014

(30) Foreign Application Priority Data

Mar. 16, 2011 (JP) .................. 2011-058371

(51) Int. Cl.
*H01B 1/08* (2006.01)
*C01G 19/02* (2006.01)
*B82Y 30/00* (2011.01)

(52) U.S. Cl.
CPC . *H01B 1/08* (2013.01); *B82Y 30/00* (2013.01); *C01G 19/02* (2013.01); *C01P 2002/52* (2013.01); *C01P 2002/54* (2013.01); *C01P 2002/82* (2013.01); *C01P 2004/04* (2013.01); *C01P 2004/62* (2013.01); *C01P 2004/64* (2013.01); *C01P 2006/12* (2013.01); *C01P 2006/40* (2013.01); *Y10T 428/2982* (2015.01)

(58) Field of Classification Search
None
See application file for complete search history.

(56) References Cited

U.S. PATENT DOCUMENTS

| 5,202,211 A | 4/1993 | Vercoulen et al. |
| 5,238,674 A | 8/1993 | Vercoulen et al. |

(Continued)

FOREIGN PATENT DOCUMENTS

| JP | 02-197014 | 8/1990 |
| JP | 06345429 A | * 12/1994 |

(Continued)

OTHER PUBLICATIONS

Senthilkumar et al. (Synthesis of fluorine doped tin oxide nanoparticles by sol-gel technique and their characterization. J. Sol-Gel Sci. Technol. (2010) 53:316-321).*

(Continued)

*Primary Examiner* — Alexandre Ferre
(74) *Attorney, Agent, or Firm* — Young & Thompson (57) ABSTRACT

Fluorine-doped tin oxide particles having a structure characterized by peaks at at least $123\pm5$ cm$^{-1}$, $139\pm5$ cm$^{-1}$, and $170\pm5$ cm$^{-1}$ in Raman spectroscopy. The particles preferably have additional Raman spectral peaks at $78\pm5$ cm$^{-1}$, $97\pm5$ cm$^{-1}$, $109\pm5$ cm$^{-1}$, $186\pm5$ cm$^{-1}$, and $207\pm5$ cm$^{-1}$. The particles preferably have a specific surface area of 10 to 300 m$^2$/g.

5 Claims, 2 Drawing Sheets

(56) References Cited

U.S. PATENT DOCUMENTS

| | | |
|---|---|---|
| 5,720,904 A | 2/1998 | Jones |
| 2009/0162697 A1* | 6/2009 | Cheng et al. .................. 428/702 |

FOREIGN PATENT DOCUMENTS

| | | |
|---|---|---|
| JP | 7-069633 | 3/1995 |
| JP | 9-503739 | 4/1997 |
| JP | 2008-166178 | 7/2008 |
| JP | 2008-184373 | 8/2008 |
| WO | WO 2011010631 A1 * | 1/2011 |

OTHER PUBLICATIONS

International Search Report, PCT/JP2012/055663, Jun. 19, 2012.

* cited by examiner

FLUORINE-DOPED TIN-OXIDE PARTICLES AND MANUFACTURING METHOD THEREFOR

TECHNICAL FIELD

This invention relates to a fluorine-doped tin oxide particle and a process for producing the same.

BACKGROUND ART

It is known that a non-electroconductive material, such as plastics, may be rendered electroconductive by the addition of an electrically conductive powder. Examples of known electroconductive powders include metal powders, carbon black, and tin oxide doped with antimony or a like dopant. Addition of metal powder or carbon black to plastics makes the plastics black, which can limit the utility of the plastics. Addition of tin oxide doped with antimony, etc. makes plastics bluish black, which can also limit the utility of the plastics as with the case of adding carbon black. In addition, using antimony involves the problem of environmental burdens. Hence, various studies have been reported on tin oxide free from an environmentally unsound dopant, such as antimony.

Patent literatures 1 and 2 (see below) propose tin oxide doped with fluorine that is an element with low environmental burden. Specifically, patent literature 1 teaches that tin oxide powder is brought into contact with 10 to 40 vol % fluorine gas in an inert gas atmosphere to provide fluorine-doped tin oxide exhibiting electroconductivity. Patent literature 2 discloses transparent tin oxide powder containing 0.3% to 5.0% of fluorine and free from any of antimony, phosphorus, and indium. The transparent tin oxide powder is obtained by adding fluorine or a fluorine compound to an aqueous solution of tin hydroxide, dehydrating the mixture, and heating the resulting solid in an inert atmosphere with a humidity of 50% or higher at 350° to 800° C.

CITATION LIST

Patent Literature

Patent literature 1: JP 2-197014A
Patent literature 2: JP 2008-184373A

SUMMARY OF INVENTION

The fluorine-doped tin oxide disclosed in the patent literatures cited are not regarded as being sufficient in electroconductivity.

An object of the invention is to provide fluorine-doped tin oxide particles free from various drawbacks of the above described conventional techniques.

Solution to Problem

The invention provides a fluorine-doped tin oxide particle having peaks at least 123±5 cm$^{-1}$, 139±5 cm$^{-1}$, and 170±5 cm$^{-1}$ in Raman spectroscopy.

The invention also provides a suitable process for producing the fluorine-doped tin oxide particle. The process includes mixing tin (II) fluoride and a basic compound in water to form a fluorine-containing tin precipitate and firing the precipitate in an oxygen-containing atmosphere.

The invention also provides another suitable process for producing the fluorine-doped tin oxide particle. The process includes mixing a water-soluble tin (II) compound except a fluoride, a water-soluble fluoride, and a basic compound in water to form a fluorine-containing tin precipitate, and firing the precipitate in an oxygen-containing atmosphere.

Advantageous Effects of Invention

The fluorine-doped tin oxide particle of the invention has high electroconductivity and stable electroconductivity with time.

DESCRIPTION OF EMBODIMENTS

The present invention will be described based on its preferred embodiments. The fluorine-doped tin oxide (hereinafter abbreviated as FTO) particle of the invention is electroconductive. In order to increase electroconductivity, tin oxide particles are doped with fluorine. The FTO particle of the invention is believed to have a structure in which the oxygen atom of a tin oxide crystal is substituted with a fluorine atom. It is considered that the FTO particle of the invention exhibits the properties of an n-type semiconductor in which electrons are the majority carrier responsible for electric conduction.

The FTO particle of the invention has a structure characterized by peaks in a small wave-number region in Raman spectroscopy, specifically at at least 123±5 cm$^{-1}$, 139±5 cm$^{-1}$, and 170±5 cm$^{-1}$. In other words, the tin oxide particle of the invention exhibits Raman activity. FTO species so far known do not show peaks at the wave-numbers recited above in their Raman spectra. That is, the FTO particle showing peaks at the wave-numbers recited above in their Raman spectra has not been unknown, and the FTO of the invention is completely novel.

Some of the FTO particles of the invention show peaks of Raman scattered light at 78±5 cm$^{-1}$, 97±5 cm$^{-1}$, 109±5 cm$^{-1}$, 186±5 cm$^{-1}$, and 207±5 cm$^{-1}$ in addition to the peaks at the first recited wave-numbers. The FTO particles showing such additional peaks at the second recited wave-numbers exhibit higher electroconductivity than those having peaks at the first recited wave-numbers. The procedures of Raman spectroscopy will be described in Examples given later.

The FTO particle of the invention showing Raman shift peaks at the specific wave-numbers described exhibits higher electroconductivity than an FTO particle that does not show these peaks. As a result of the inventors' study, it has been revealed that such Raman activity of the FTO particle of the invention disappears on heat-treating the FTO particle. A tin oxide particle having thus lost the Raman activity does not exhibit high electroconductivity any longer but exhibits high electric resistance. The inventors consider from this that the electroconductivity of the tin oxide particle of the invention is attributed to lattice vibration developing electroconductivity. The aforementioned heat treatment is carried out, for example, at 450° C. or higher for 2 hours or longer in the atmosphere.

The increased electroconductivity of conventionally known electroconductive tin oxide is generally obtained by doping tetravalent tin with a dopant element, such as fluorine, antimony, niobium, or tantalum. In contrast, enhancement of electroconductivity is achieved in the invention by controlling the lattice vibration in FTO. Specifically, the Raman activity of the FTO particle of the invention is considered attributable to conductive paths allowing for electroconductivity. Nevertheless, seeing that powder XRD reveals no substantial differences between the FTO particle of the invention and so far known FTO particles, it is contemplated that the difference of the FTO particle of the invention from the conventional FTO particles consists not in medium- and long-range order of the crystal structure as would be observed in powder XRD but in microstructure such as a short-range order or an interatomic bond. The inventors consider that the carrier mobility increases because of this difference thereby to achieve low resistivity. To adopt this structure allows for increasing the electroconductivity of FTO particles while overcoming the drawbacks of using a dopant element, such as economical disadvantage and large environmental burden.

The FTO particles having Raman activity are obtained by preparing FTO particles in accordance with the hereinafter described processes.

Tin oxide having only divalent tin is, while being electroconductive, black-colored and therefore unable to be used in applications requiring transparency, such as a transparent electroconductive film. Tin oxide having only tetravalent tin is unable to have increased electroconductivity over that of tin oxide having only divalent tin. Contrastingly, the FTO particles of the invention have a whitish color, which allows application to a transparent electroconductive film, and exhibit high electroconductivity, which makes it feasible to provide a transparent electroconductive film with increased electroconductivity. The FTO particle of the invention exhibits similar diffraction peaks to those of tetravalent tin oxide ($SnO_2$) in powder XRD so that the valence of the tin in the FTO particles of the invention seems to be four for the most part.

The dopant fluorine content in the FTO particles of the invention is preferably 0.01 to 5 mass %, more preferably 0.05 to 1 mass %, relative to the total mass of FTO, in terms of increasing electroconductivity of FTO particles without impairing economy. The oxygen to tin ratio in the FTO particles is preferably 1.5 to 2.5 mol, more preferably 1.8 to 2.2 mol, of oxygen per mole of tin.

The FTO particle of the invention may contain, as dopant elements, only fluorine, and not contain other dopant elements, such as chlorine. Alternatively, the FTO particle of the invention may contain other dopant elements, such as chlorine, in addition to fluorine. When the FTO particle contains chlorine in addition to fluorine as an additional dopant, chlorine, being of the same group as fluorine, substitutes for oxygen in the tin oxide crystals to generate carrier electrons to further reduce the resistance of the FTO particle. From this viewpoint, the content of chlorine, if any, is preferably 0.01 to 1.5 mass %, more preferably 0.05 to 1 mass %, relative to the total mass of the FTO particles.

It is said that tin oxide generally should have oxygen deficiency in its crystal structure in order to exhibit electroconductivity. The FTO particle of the invention is, in contrast, substantially free of oxygen deficiency as will be understood from the processes of production hereinafter described. To be free of oxygen deficiency brings the advantage of high stability of electric resistance with time. Conventionally known FTO particles are produced under conditions that generate oxygen deficiency. Therefore, fluorine is not sufficiently fixed in the FTO crystals and, as a result, the stability of electric resistance with time appears to be inferior.

The fact that the FTO particles of the invention are substantially free of oxygen deficiency can be confirmed by using, as a measure, an increase ratio in powder resistivity between before and after a pressure cooker test (hereinafter "PCT") carried out under the conditions described below. When the powder resistivity increase ratio between before and after the PCT is low, specifically when the powder resistivity increase ratio represented by Rb/Ra, wherein Ra is the powder resistivity of FTO particles before the PCT, and Rb is the powder resistivity of FTO particles after the PCT, is preferably 10 or smaller, more preferably 8 or smaller, the FTO particles are regarded as being substantially free of oxygen deficiency. A PCT is carried out as follows.

Two grams of FTO particles and 1 g of water are sealed in a 30 ml pressure container, and the container is maintained at 180° C. for 3 hours in the atmosphere. After the container cools to room temperature, the particles are taken out, dried in the atmosphere at 80° C. for 2 hours, and subjected to measurement of powder resistivity in accordance with the procedure described later.

Not only does the FTO particle of the invention show a low increase ratio of powder resistivity as stated, the powder resistivity per se of the FTO particle is as low as $10^1$ $\Omega\cdot cm$ or less, preferably $10^0$ $\Omega\cdot cm$ or less, more preferably $10^{-1}$ $\Omega\cdot cm$ or less, at 500 kgf/cm².

The average primary particle size of the FTO particles of the invention is preferably 1 to 5000 nm, more preferably 3 to 3000 nm, even more preferably 3 to 1000 nm, yet even more preferably 3 to 200 nm. The method for measuring the average primary particle size will be described in Examples given later. The particle size of the FTO particles is adjustable by adding an organic compound having a hydroxyl group or adjusting the amount of the compound to be added in the hereinafter described processes for producing the FTO particles.

The FTO particles of the invention have a high specific surface area. Specifically, the BET specific surface area of the FTO particles is 10 to 300 m²/g, preferably 10 to 100 m²/g, more preferably 10 to 40 m²/g. The specific surface area of the FTO particles is adjustable by adding an organic compound having a hydroxyl group or adjusting the amount of the compound to be added in the hereinafter described processes for producing the FTO particles.

The FTO particles of the invention exhibit high transparency when formed into film. For example, a film having a thickness of 2 to 3 μm and containing the FTO particles in an amount of 30 to 80 mass % exhibits very high transparency as having a total transmittance of 85% or more, preferably 90% or more, in the visible light region. The FTO particles of the invention have low transparency to infrared light. For example, a film having a thickness of 2 to 3 μm and containing the FTO particles in an amount of 30 to 80 mass % exhibits high infrared shielding properties as preferably having an infrared transmittance of 80% or less, more preferably 70% or less, at a wavelength of 1500 nm and of 50% or less, more preferably 30% or less, at 2000 nm. Film formation and measurement of total visible light transmittance and infrared transmittance will be described in Examples.

A preferred process for producing the FTO particles of the invention is described below. This process will hereinafter be referred to as process 1. Process 1 includes the steps of mixing tin (II) fluoride and a basic compound in water to form a fluorine-containing tin precipitate and firing the precipitate in an oxygen-containing atmosphere. Each step will hereinafter be described in detail.

An aqueous solution of tin (II) fluoride is provided as a starting material. The tin (II) fluoride concentration in the aqueous solution is preferably $1.0\times10^{-3}$ to 2.5 mol/l, more preferably $1.0\times10^{-2}$ to 1 mol/l. Using tetravalent tin in place of divalent tin only results in the production of highly resistant tin oxide.

Separately from the aqueous solution of tin (II) fluoride, an aqueous solution of a basic compound (alkali) is provided. Illustrative examples of the basic compound include alkali metal hydroxides, e.g., sodium hydroxide and potassium hydroxide; alkaline earth metal hydroxides, e.g., magnesium hydroxide; carbonates, e.g., $NaHCO_3$ and $NH_4HCO_3$; and ammonia. The basic compound aqueous solution preferably has a hydroxide ion concentration of $1.0\times10^{-3}$ to 6 mol/l, more preferably $1.0\times10^{-2}$ to 1 mol/l.

The provided tin (II) fluoride aqueous solution and basic compound aqueous solution are mixed to form a precipitate of fluorine-containing tin. To form the precipitate, the tin (II) fluoride aqueous solution may be a mother solution, to which the basic compound aqueous solution is fed, or the basic compound aqueous solution may be a mother solution, to which the tin (II) fluoride aqueous solution is fed. Whichever serves as a mother solution, the mixing ratio of the tin (II) fluoride aqueous solution and the basic compound aqueous solution is preferably 0.1 to 5 mol, more preferably 0.5 to 4 mol, of hydroxide ion per mole of tin (II). Whichever solution is used as a mother solution, the other solution may be added to the mother solution either sequentially in portions or all at once. Addition in portions is preferred in terms of ease of reaction control.

The mixing of the tin (II) fluoride aqueous solution and the basic compound aqueous solution is carried out with or without heating. The mixing under heating may be performed by heating the mother solution, for example, to a predetermined temperature and adding thereto the other solution which may be either heated or non-heated. The heating temperature is preferably 30° to 100° C., more preferably 40° to 95° C.

The fluorine-containing tin precipitate formed on mixing the tin (II) fluoride aqueous solution and the basic compound aqueous solution is a precursor of desired FTO. While the details of the precursor are not clear at present, it appears that the precursor contains tin and oxygen and that the tin is divalent. The molar ratio of tin and oxygen in the precursor is calculated from the amounts of tin and oxygen as determined through chemical analyses such as ICP.

As a result of the inventors' study, it turned out advantageous to add an organic compound having a hydroxyl group to the tin (II) fluoride aqueous solution prior to mixing the tin (II) fluoride aqueous solution and the basic compound aqueous solution. The presence of a hydroxyl-containing organic compound in the tin (II) fluoride aqueous solution allows for broadening the ranges of the divalent tin ion concentration in the tin (II) fluoride aqueous solution and the amount of the basic compound aqueous solution to be added. In short, the degrees of freedom of selecting the amounts of tin (II) fluoride and the basic compound to be added and the reaction temperature increase. This not only makes it easier to adjust the particle size and specific surface area of the resulting FTO particles but is also effective in minimizing by-production of SnO.

The hydroxyl-containing organic compound may be a low-molecular compound or a high-molecular compound. Examples of the low-molecular, hydroxyl-containing organic compound include monohydric alcohols which may be aliphatic, alicyclic, or aromatic. Examples of useful aliphatic monohydric alcohols include those having 1 to 6 carbon atoms, such as methanol, ethanol, n-butanol, and n-hexanol. Examples of useful alicyclic monohydric alcohols are cyclohexanol and terpineol. Examples of useful aromatic monohydric alcohols include benzyl alcohol.

Illustrative examples of the high-molecular, hydroxyl-containing compound include polyvinyl alcohol and polyols. The polyvinyl alcohol may be non-modified or modified and may be fully or partially (80% to 90%) hydrolyzed polyvinyl alcohol. Examples of modified polyvinyl alcohols include carboxyl-modified, alkyl-modified, acetoacetyl-modified, acrylic acid-modified, methacrylic acid-modified, pyrrolidone-modified, vinylidene-modified, or silanol-modified polyvinyl alcohol. Polyvinyl alcohols $[-CH(OH)CH_2-]_n$ with an average degree of polymerization (n) of 200 to 30,000 are preferred, with those in which n=500 to 10,000 being more preferred. The degree of polymerization may be determined by, for example, size exclusion chromatography (SEC). Examples of useful polyols are ethylene glycol, diethylene glycol, triethylene glycol, polyethylene glycol, polypropylene glycol, propanediol, butanediol, pentanediol, hexanediol, glycerol, hexanetriol, butanetriol, and 3-methylpentane-1,3,5-triol. Carbitols are also useful, including methoxyethanol, ethoxyethanol, propoxyethanol, butoxyethanol, methoxyethoxyethanol, ethoxyethoxyethanol, propoxyethoxyethanol, and butoxyethoxyethanol.

In using a monohydric alcohol as a hydroxyl-containing organic compound, its concentration in the tin (II) fluoride aqueous solution is preferably 0.005 to 30 mass %, more preferably 0.01 to 10 mass %. When the concentration is within that range, inconveniences such as thickening are prevented from occurring while obtaining sufficient effects of addition of the hydroxyl-containing organic compound, thereby successfully producing FTO particles with uniformity in particle size. In using a high-molecular, hydroxyl-containing organic compound, the concentration is preferably 0.005 to 10 mass %, more preferably 0.01 to 5 mass %, for the same reason.

The ratio of divalent tin to the hydroxyl-containing organic compound in the tin (II) fluoride aqueous solution is preferably 0.01 to 150, more preferably 0.03 to 75, in terms of Sn to OH (Sn/OH) molar ratio. Within that range, it is less likely that unreacted Sn ions remain in water and that by-produced tin oxide or oxyhydroxide precipitates.

On mixing the tin (II) fluoride aqueous solution and the basic compound aqueous solution, a fluorine-containing tin precipitate forms in the liquid. The liquid sometimes contain by-produced tin oxyhydroxide. To remove the oxyhydroxide, hydrogen peroxide may be added to the reaction system to oxidize the tin oxyhydroxide. Hydrogen peroxide is preferably added in the form of an aqueous solution diluted to a prescribed concentration. The concentration of hydrogen peroxide in the dilute aqueous solution is preferably about 0.1 to 15 mass %. Addition of too much hydrogen peroxide would result in a failure to form desired FTO, only to produce tin dioxide.

The fluorine-containing tin precipitate is collected by filtration and repulped with water to be freed of impurities. After repulping, the precipitate is dried in the atmosphere using a hot air drier and then fired in the atmosphere in a firing furnace to yield desired FTO particles. The firing is preferably carried out at a temperature of preferably 300° to 800° C., more preferably 400° to 700° C., for preferably 0.5 to 24 hours, more preferably 0.5 to 5 hours. Too high firing temperatures would cause fluorine to vaporize only to form tin dioxide.

As remarked above, the firing is performed in the atmosphere, i.e., in an oxygen-containing atmosphere. The firing operation in conventional processes for producing FTO particles is usually conducted in an inert atmosphere or a reducing atmosphere in order to generate oxygen deficiency in crystals. In the invention, in contrast, the firing is carried out in an oxidative atmosphere. Understandably, the firing in the invention theoretically generates no oxygen deficiency. That is, the resulting FTO particles are substantially free of oxygen deficiency. The advantages of the FTO particles substantially free of oxygen deficiency are as mentioned previously.

The thus obtained FTO particles are then subjected to a disagglomeration operation using, for example, a media mill, e.g., a bead mill, to a predetermined particle size. The FTO particles after the disagglomeration operation may be dispersed, e.g., in water or an organic solvent using a bead mill, a paint shaker, or the like to provide a transparent monodisperse dispersion. Useful organic solvents include polyhydric alcohols, monohydric alcohols, cellosolves, carbitols, ketones, and mixtures thereof. The concentration of the FTO particles in the transparent dispersion is preferably 0.1 to 50 mass %, more preferably 1 to 40 mass %. The transparent dispersion exhibits high storage stability. The transparent dispersion may be mixed with a binder to provide an ink material.

Examples of the polyhydric alcohols are ethylene glycol, diethylene glycol, triethylene glycol, polyethylene glycol, polypropylene glycol, propanediol, butanediol, pentanediol, hexanediol, glycerol, hexanetriol, butanetriol, 3-methylpentane-1,3,5-triol, and glycerin. Examples of the monohydric alcohols are methanol, ethanol, propanol, pentanol, hexanol, octanol, nonanol, decanol, terpineol, benzyl alcohol, and cyclohexanol. Examples of the carbitols are methoxyethanol, ethoxyethanol, propoxyethanol, butoxyethanol, methoxyethoxyethanol, ethoxyethoxyethanol, propoxyethoxyethanol, and butoxyethoxyethanol. Examples of the ketones are acetone, methyl ethyl ketone, diethyl ketone, methyl isobutyl ketone, and diacetone alcohol.

The FTO particles of the invention may be produced by another process (hereinafter referred to as process 2) in place of process 1 described above. Process 2 includes mixing a water-soluble tin (II) compound except a fluoride, a water-soluble fluoride, and a basic compound in water to form a fluorine-containing tin precipitate, and firing the precipitate in an oxygen-containing atmosphere.

An aqueous solution of a water-soluble tin (II) compound is provided as a starting material. Useful water-soluble tin (II) compounds include tin (II) chloride, tin (II) sulfate, tin (II) nitrate, and a hydrate thereof. A solution of metallic tin in a mineral acid is also useful. In particular, tin (II) chloride is preferred, in which case tin oxide particles doped with chlorine in addition to fluorine are obtained. The concentration of the water soluble tin (II) compound in the aqueous solution is preferably $1.0 \times 10^{-3}$ to 2.5 mol/l, more preferably $1.0 \times 10^{-2}$ to 1 mol/l.

Examples of the water soluble fluoride include $NH_4F \cdot HF$, NaF, $NH_4F$, HF, LiF, KF, $KF \cdot HF$, and $NaF \cdot HF$. The water soluble fluoride may be dissolved in water to be used in the form of an independent aqueous solution or may be present in the above described water soluble tin (II) compound aqueous solution.

Basic compounds suitable for use in process 2 are the same as those used in process 1. Accordingly, the description about the basic compound used in process 1 applies to process 2.

Process 2 is preferably carried out by mixing a mixed aqueous solution containing the water soluble tin (II) compound and the water soluble fluoride with an aqueous solution of the basic compound to form a precipitate of fluorine-containing tin. To form the precipitate, the mixed aqueous solution of the water soluble tin (II) compound and the water soluble fluoride may be a mother solution, to which the basic compound aqueous solution is fed, or the basic compound aqueous solution may be a mother solution, to which the mixed aqueous solution of the water soluble tin (II) compound and the water soluble fluoride is fed. Whichever serves as a mother solution, the mixing ratio of the mixed aqueous solution of the water soluble tin (II) compound and the water soluble fluoride, and the basic compound aqueous solution is preferably 0.1 to 5 mol, more preferably 0.5 to 4 mol, of hydroxide ion per mole of the mixture of the water soluble tin (II) compound and the water soluble fluoride. Whichever solution is used as a mother solution, the other solution may be added to the mother solution either in portions or all at once. Addition in portions is preferred in terms of ease of reaction control.

The mixing of the mixed aqueous solution of the water soluble tin (II) compound and the water soluble fluoride, and the basic compound aqueous solution is carried out with or without heating. The mixing under heating may be performed by heating the mother solution, for example, to a predetermined temperature and adding thereto the other solution which may be either heated or non-heated. The heating temperature is preferably 30° to 100° C., more preferably 40° to 95° C.

Prior to mixing the mixed aqueous solution of the water soluble tin (II) compound and the water soluble fluoride, and the basic compound aqueous solution, it is advantageous to add an organic compound having a hydroxyl group to the mixed aqueous solution for the same reason as mentioned with respect to process 1. The description about the hydroxyl-containing organic compound useful in process 1 applies to process 2.

On mixing the mixed aqueous solution of the water soluble tin (II) compound and the water soluble fluoride, and the basic compound aqueous solution, a fluorine-containing tin precipitate forms in the liquid. It is preferred to add hydrogen peroxide to the liquid similarly to process 1. Addition of hydrogen peroxide facilitates by-product removal.

The thus obtained fluorine-containing tin precipitate is worked up in the same manner as in process 1 to yield desired FTO particles. As previously noted, when tin (II) chloride is used as a water soluble tin (II) compound, fluorine- and chlorine-doped tin oxide particles are obtained.

Whichever process is followed, the resulting FTO particles are applicable to a broad range of fields with their high electroconductivity taken advantage of, such as charging rollers, photoreceptor drums, toners, electrostatic brushes, and the like of printers or copiers; flat panel displays, CRTs, Braun tubes, touchscreens, solar cells; coatings, inks, emulsions, and the like. With the high reflectance to infrared radiation being taken advantage of, the FTO particles are also useful as a material of infrared shields.

EXAMPLES

The invention will now be illustrated in greater detail with reference to Examples, but it should be understood that the scope of the invention is not limited thereto. Unless otherwise noted, all the percentages are given by mass.

Example 1

In 490 g of pure water was dissolved 4.51 g of sodium hydroxide to prepare a basic aqueous solution, designated solution A. Separately, in a 200 ml beaker containing 100 g of pure water was put 5.0 g of polyvinyl alcohol (average degree of polymerization: 400 to 600; fully hydrolyzed product; hereinafter abbreviated as PVA) and dissolved by heating at 90° C. to prepare a PVA aqueous solution, designated solution B. Separately, in a separate beaker was put 390 g of pure water, and 11.21 g of tin fluoride was dissolved therein to prepare a tin aqueous solution, designated solution C. The whole amount of solution B was added to solution C, followed by thoroughly mixing to provide a mother solution, designated solution D.

Solution D was heated to 90° C. while stirring with a paddle stirrer, and the whole amount of solution A was fed thereto using a tube pump. During the feed, the pH of solution D was 3 to 4. After completion of the addition, the mixture was aged for 5 minutes. A solution of 0.75 g of a 30% hydrogen peroxide solution in 30 g of pure water, designated solution E, was then slowly added to the mixture, followed by aging for 5 minutes to form a tin dioxide precursor.

The precursor was collected by filtration through filter paper (Advantec 5C), and the filter cake was washed by pouring 1 liter of pure water. The filter cake was repulped with 1 liter of pure water, followed by filtration, followed by washing by pouring water. These operations were repeated three times to wash the precursor particles. The washed cake was dried in the atmosphere using a hot air drier set at 120° C. for 10 hours and disagglomerated in an agate mortar. The halogen content of the precursor particles was found to be 0.4% fluorine as determined by XRF using ZSX Primus II from Rigaku Corp. The precursor particles were fired in the atmosphere in an electric furnace at 450° C. for 3 hours to give desired FTO particles.

Example 2

FTO particles were obtained in the same manner as in Example 1, except that solution E (dilute hydrogen peroxide solution) was not added.

Example 3

FTO particles were obtained in the same manner as in Example 1, except that solution E (dilute hydrogen peroxide solution) was not added and that the step of washing the precursor was carried out using pure water at 90° C. to thoroughly remove adsorbed fluorine.

Example 4

FTO particles were obtained in the same manner as in Example 1, except that (1) solution E (dilute hydrogen peroxide solution) was not added, (2) the amount of sodium hydroxide in solution A was changed to 5.3 g, (3) solution B (PVA aqueous solution) was not added, and (4) the mixing of solution A and solution D was conducted at room temperature (about 25° C.).

Example 5

In 490 g of pure water was dissolved 5.84 g of sodium hydroxide to prepare a basic aqueous solution, designated solution A. Separately, 0.5 g of PVA (average degree of polymerization: 400 to 600; fully hydrolyzed product) was put in a 200 ml beaker containing 100 g of pure water and dissolved by heating at 90° C. to prepare a PVA aqueous solution, designated solution B. In a separate beaker was put 390 g of pure water, and 12.58 g of tin chloride and 5.5 g of NaF were dissolved therein to prepare a tin aqueous solution, designated solution C. The whole amount of solution B was added to solution C, followed by thoroughly mixing to provide a mother solution, designated solution D. Fluorine- and chlorine-doped tin oxide particles were obtained in otherwise the same manner as in Example 1.

Example 6

FTO particles were obtained in the same manner as in Example 2, except for changing the precursor firing conditions to 600° C. and 3 hours.

Example 7

FTO particles were obtained in the same manner as in Example 1, except that (1) solution E (dilute hydrogen peroxide solution) was not added, (2) the amount of sodium hydroxide in solution A was changed to 5.3 g, (3) solution A was used as a mother solution, to which solution D was fed, and (4) the mixing of solution A and solution D was conducted at room temperature (about 25° C.).

Example 8

FTO particles were obtained in the same manner as in Example 1, except that (1) solution E (dilute hydrogen peroxide solution) was not added, (2) the amount of sodium hydroxide in solution A was changed to 5.84 g, (3) solution B (PVA aqueous solution) was not added, and (4) the mixing of solution A and solution D was conducted at room temperature (about 25° C.).

Example 9

FTO particles were obtained in the same manner as in Example 1, except that (1) solution E (dilute hydrogen peroxide solution) was not added, (2) the amount of sodium hydroxide in solution A was changed to 10.6 g, (3) the amount of tin fluoride in solution C was changed to 22.42 g, (4) solution B (PVA aqueous solution) was not added, and (5) the mixing of solution A and solution D was conducted at room temperature (about 25° C.).

Example 10

FTO particles were obtained in the same manner as in Example 1, except that solution E (dilute hydrogen peroxide solution) was not added and that the mixing of solution A and solution D was conducted at room temperature (about 25° C.).

Example 11

Fluorine- and chlorine-doped tin oxide particles were obtained in the same manner as in Example 5, except for replacing 5.5 g of NaF in solution C to 3.76 g of $NH_4F \cdot HF$.

Example 12

Fluorine- and chlorine-doped tin oxide particles were obtained in the same manner as in Example 5, except for replacing 5.5 g of NaF in solution C to 3.76 g of $NH_4F \cdot HF$ and using solution A as a mother solution to which solution D was fed.

Example 13

Fluorine- and chlorine-doped tin oxide particles were obtained in the same manner as in Example 5, except for changing the amount of NaF in solution C from 5.5 g to 0.55 g.

Example 14

Fluorine- and chlorine-doped tin oxide particles were obtained in the same manner as in Example 5, except for changing the amount of NaF in solution C from 5.5 g to 2.72 g.

Comparative Example 1

Comparative Example 1 represents addition of an increased amount of hydrogen peroxide. That is, FTO particles were obtained in the same manner as in Example 1, except for using 7.5 g of a 30% hydrogen peroxide solution diluted with 30 g of pure water as solution E.

Comparative Example 2

Comparative Example 2 represents an example in which the precursor was fired at a high temperature. That is, FTO particles were obtained in the same manner as in Example 1, except for changing the firing conditions to 1000° C. and 3 hours.

Comparative Example 3

Comparative Example 3 is an experiment following the procedure of Example 1 of patent literature 2 (JP 2008-184373). The experiment was carried out in accordance with the description of Example 1 of patent literature 2, except for changing the firing conditions to 450° C. and 2 hours.

Comparative Example 4

Tin oxide particles (reagent) available from Kojundo Chemical Lab. Co., Ltd. were used.

Figure 1:
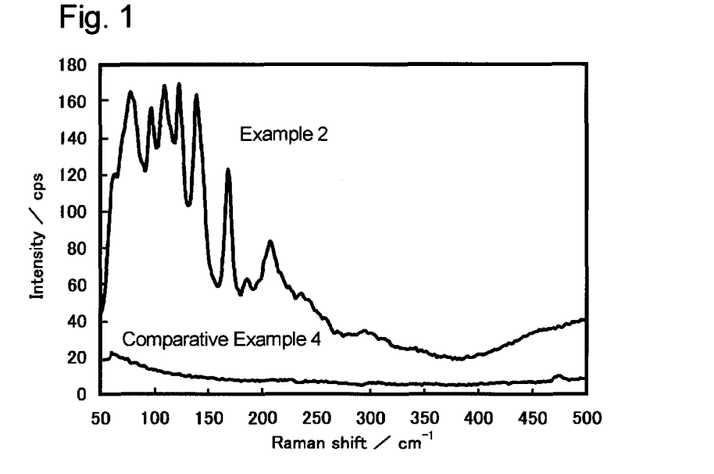
FIG. 1 shows Raman spectra of the tin oxide particles obtained in Example 2 and Comparative Example 4.
Figure 2:
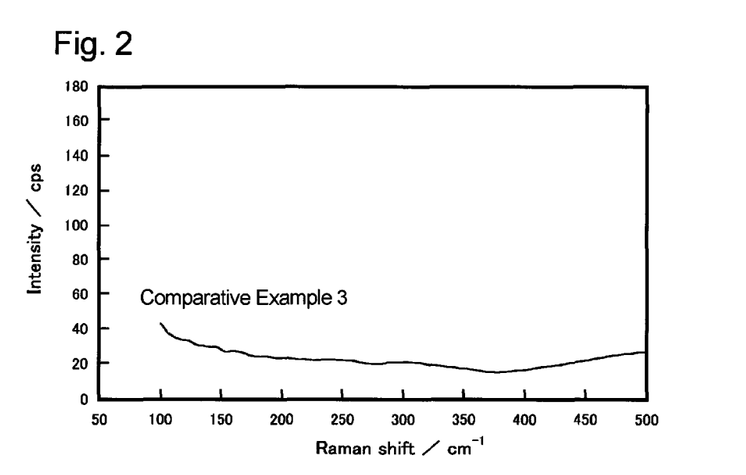
FIG. 2 shows a Raman spectrum of the tin oxide particles obtained in Comparative Example 3.
Figure 3A:
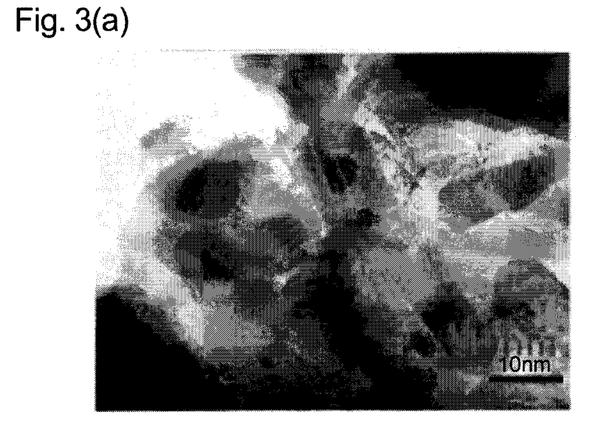
FIG. 3(a) and FIG. 3(b) are transmission electron micrographs of the tin oxide particles obtained in Example 2.
Figure 3B:
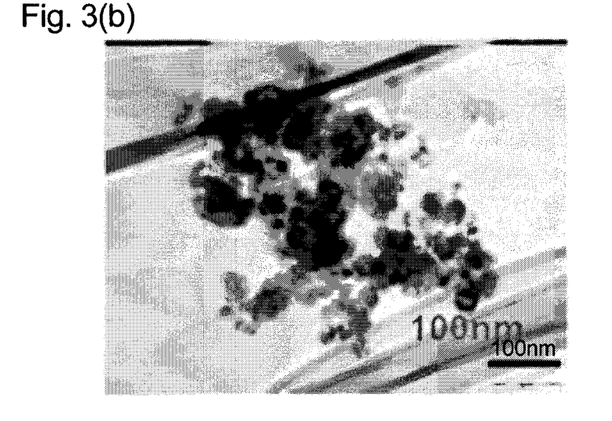

Evaluation:

The tin oxide particles obtained in Examples and Comparative Examples were analyzed in terms of halogen content, structural identification by XRD, elemental analysis (for tin and oxygen), BET specific surface area by nitrogen adsorption, average primary particle size, and powder resistivity. The results obtained are shown in Table 1 below. The particles of Example 2 and Comparative Examples 3 and 4 were subjected to Raman spectroscopy. The results are shown in FIGS. 1 and 2. Raman spectroscopy was carried out as described below. A transmission electron micrograph of the FTO particles of Example 2 is shown in FIG. 3. The particles of Examples 1 to 5 and Comparative Examples 1 to 4 were tested to determine the increase in powder resistivity between before and after PCT in accordance with the method described supra and to determine the total visible light transmittance and infrared transmittance at 1500 nm in accordance with the methods described infra. The results are shown in Table 2.

(1) Halogen Content

Measured using ZSX Primus II from Rigaku Corp.

(2) XRD

XRD was carried out using RINT-TTRIII from Rigaku Corp. Powder was put in a glass holder dedicated for powder XRD attached to the apparatus and analyzed under the following conditions:

Measuring range: 2θ (deg/CuKα)=from 5° to 80°
Tube voltage: 50 kV
Tube current: 300 mA
Scanning rate: 4°/min (3) Elemental Analysis (for Tin and Oxygen)

The tin content was determined using ICP, SPS-3000, from SII NanoTechnology Inc. The oxygen content was determined using a gas analyzer EMGA-620, from Horiba, Ltd. The reason the tin content and the oxygen content in Table 1 do not total 100% resides in the difference of the analysis methods.

(4) BET Specific Surface Area

Measured using FlowSorb 2300 from Shimadzu Corp. under the following conditions.

Amount of sample powder: 0.3 g
Preliminary degassing: 120° C., 10 minutes in a nitrogen stream (5) Average Primary Particle Size A particle diameter calculated from the BET specific surface area determined in (4) above was taken as an average primary particle size.

(6) Powder Resistivity

The powder was compressed under a pressure of 500 kgf/$cm^2$ to make a sample. The resistivity of the sample was measured by the four-probe resistance method using Lorest PAPD-41 from Mitsubishi Chemical Corp.

(7) Total Visible Light Transmittance

The FTO particles weighing 7.4 g and 6.4 g of a commercially available acrylic resin were added to 10 g of a toluene/butanol (=7:3 by mass) mixed solvent and dispersed therein with beads in a paint shaker. The resulting dispersion was applied to a PET film and air dried for 1 hour to form a transparent film, the thickness of which was found to be 2 μm as observed using an electron microscope. The total visible light transmittance of the film was determined using a transmission measuring instrument NDH-1001DP from Nippon Denshoku Industries Co., Ltd.

(8) Infrared Transmittance at 1500 nm

The infrared transmittance of the film prepared in the same manner as described in (7) above was measured using a spectrophotometer U-4000 from Hitachi High-Technologies Corp.

(9) Raman Spectroscopy

Raman spectroscopy was performed using a laser Raman spectrometer NRS-2100 from JASCO Corp. by microscopic analysis (CCD mode). Light from a laser (λ=514.5 nm; output: 100 mW) was used as exciting light. The Raman spectrum was collected in a range of from 50 to 500 $cm^{-1}$. The exposure time was 10 seconds. The number of scans was two. The sample was prepared by filling a 10 diameter mold with 0.1 g of the powder and pressing at 1 ton/$cm^2$ to make a pellet.

TABLE 1

| | Precursor Halogen Content (%) | Halogen Content (%) | Tin Oxide Particles | | | | | |
|---|---|---|---|---|---|---|---|---|
| | | | | Elemental Analysis | | BET Specific Surface Area | Average Primary Particle Size | Powder Resistivity |
| | | | Structure | Ti (%) | O (%) | ($m^2$/g) | (nm) | (Ω·cm) |
| Example 1 | F = 0.3 | F = 0.1 | $SnO_2$ | 78 | 21 | 32 | 27 | $1 \times 10^0$ |
| Example 2 | F = 0.4 | F = 0.2 | $SnO_2$ | 78 | 21 | 16 | 54 | $1 \times 10^{-1}$ |
| Example 3 | F = 0.1 | F = 0.1 | $SnO_2$ | 79 | 21 | 13 | 66 | $4 \times 10^{-1}$ |

TABLE 1-continued

| | Precursor Halogen Content (%) | Halogen Content (%) | Structure | Elemental Analysis Sn (%) | Elemental Analysis O (%) | BET Specific Surface Area ($m^2/g$) | Average Primary Particle Size (nm) | Powder Resistivity ($\Omega \cdot cm$) |
|---|---|---|---|---|---|---|---|---|
| Example 4 | F = 0.9 | F = 0.4 | $SnO_2$ | 79 | 20 | 23 | 37 | $3 \times 10^{-1}$ |
| Example 5 | F = 0.3, Cl = 0.1 | F = 0.2, Cl = 0.1 | $SnO_2$ | 78 | 22 | 19 | 45 | $9 \times 10^{-2}$ |
| Example 6 | F = 0.4 | F = 0.2 | $SnO_2$ | 78 | 22 | 12 | 71 | $3 \times 10^{0}$ |
| Example 7 | F = 0.7 | F = 0.2 | $SnO_2$ | 79 | 20 | 26 | 33 | $1 \times 10^{-1}$ |
| Example 8 | F = 0.4 | F = 0.3 | $SnO_2$ | 79 | 21 | 20 | 43 | $6 \times 10^{-1}$ |
| Example 9 | F = 1.0 | F = 0.3 | $SnO_2$ | 78 | 21 | 19 | 45 | $4 \times 10^{-1}$ |
| Example 10 | F = 0.9 | F = 0.5 | $SnO_2$ | 78 | 21 | 21 | 41 | $1 \times 10^{-1}$ |
| Example 11 | F = 0.9, Cl = 0.2 | F = 0.4, Cl = 0.1 | $SnO_2$ | 78 | 21 | 21 | 41 | $3 \times 10^{-1}$ |
| Example 12 | F = 1.0, Cl = 0.1 | F = 0.2, Cl = 0.1 | $SnO_2$ | 78 | 22 | 23 | 37 | $1 \times 10^{-1}$ |
| Example 13 | F = 0.2, Cl = 0.5 | F = 0.1, Cl = 0.3 | $SnO_2$ | 79 | 20 | 15 | 57 | $7 \times 10^{-1}$ |
| Example 14 | F = 0.3, Cl = 0.5 | F = 0.3, Cl = 0.3 | $SnO_2$ | 78 | 21 | 17 | 50 | $2 \times 10^{-1}$ |
| Compara. Example 1 | N.D. | N.D. | $SnO_2$ | 78 | 21 | 60 | 14 | $5 \times 10^{4}$ |
| Compara. Example 2 | F = 0.4 | N.D. | $SnO_2$ | 79 | 21 | 7 | 122 | $1 \times 10^{5}$ |
| Compara. Example 3 | F = 0.3 | F = 0.1 | $SnO_2$ | 78 | 22 | 20 | 43 | $2 \times 10^{1}$ |
| Compara. Example 4 | N.D. | N.D. | $SnO_2$ | 79 | 21 | 2 | 429 | $4 \times 10^{5}$ |

N.D.: Not-Detected

TABLE 2

| | Increase in Powder after PCT (Ra/Rb) | Evaluation of Film Total Visible Light Transmittance (%) | Evaluation of Film Infrared Transmittance (%) |
|---|---|---|---|
| Example 1 | 5 | 92 | 65 |
| Example 2 | 7 | 90 | 58 |
| Example 3 | 6 | 88 | 65 |
| Example 4 | 7 | 89 | 60 |
| Example 5 | 8 | 91 | 55 |
| Compara. Example 1 | 14 | 90 | 82 |
| Compara. Example 2 | 3 | 71 | 65 |
| Compara. Example 3 | 15 | 89 | 84 |
| Compara. Example 4 | 2 | 55 | 52 |

As is apparent from the results in FIG. 1, the FTO particles of Example 2 show Raman spectral peaks in a small wavenumber region, specifically at about 78 $cm^{-1}$, about 97 $cm^{-1}$, about 109 $cm^{-1}$, about 123 $cm^{-1}$, about 139 $cm^{-1}$, about 170 $cm^{-1}$, about 186 $cm^{-1}$, and about 207 $cm^{-1}$. In contrast, the particles of Comparative Examples 3 and 4 do not show such peaks as is seen from the results in FIGS. 1 and 2. While not shown in FIGS. 1 and 2, the FTO particles obtained in other Examples were observed to show the similar Raman spectra to that of Example 2.

Furthermore, the results in Tables 1 and 2 clearly demonstrate that the F-doped tin oxide particles and the F- and Cl-doped tin oxide particles obtained in Examples exhibit high electroconductivity and high visible light transmission and have a large specific surface area. The results also prove that these particles exhibit good results in the PCT. Although the particles of Comparative Examples 2 and 4 show satisfactory results in the PCT because of the absence of oxygen deficiency, it should be noted that they have high electric resistance on account of the absence of oxygen deficiency. Moreover, the films of the particles of Comparative Examples 2 and 4 have a reduced total visible light transmittance due to their small BET specific surface area, namely, large particle size.

The invention claimed is:

1. A fluorine-doped tin oxide particle having peaks at at least 123±5 $cm^{-1}$, 139±5 $cm^{-1}$, and 170±5 $cm^{-1}$ in Raman spectroscopy.

2. The fluorine-doped tin oxide particle according to claim 1, further having Raman spectral peaks at 78±5 $cm^{-1}$, 97±5 $cm^{-1}$, 109±5 $cm^{-1}$, 186±5 $cm^{-1}$, and 207±5 $cm^{-1}$.

3. The fluorine-doped tin oxide particle according to claim 1, having a specific surface area of 10 to 300 $m^2/g$.

4. The fluorine-doped tin oxide particle according to claim 1, having an average primary particle size of 1 to 5000 nm.

5. The fluorine-doped tin oxide particle according to claim 1, being further doped with chlorine.

* * * * *